United States Patent [19]

Rose et al.

[11] Patent Number: 4,682,030

[45] Date of Patent: Jul. 21, 1987

[54] INFRARED RADIATION DETECTOR WITH INTEGRAL FRESNEL LENS WINDOW

[75] Inventors: Michael A. Rose, Winchester; Martin Renals, Swindon, both of England

[73] Assignee: U.S. Philips Corporation, New York, N.Y.

[21] Appl. No.: 767,317

[22] Filed: Aug. 19, 1985

[30] Foreign Application Priority Data

Aug. 24, 1984 [GB] United Kingdom ............... 8421507

[51] Int. Cl.$^4$ .............................................. G01J 5/08
[52] U.S. Cl. .................................... 250/338; 250/353
[58] Field of Search .......... 250/353, 338 SE, 338 PY, 250/338 FE, 338 R; 350/452

[56] References Cited

U.S. PATENT DOCUMENTS 4,493,535 1/1985 Champeau ........................ 350/452

FOREIGN PATENT DOCUMENTS 1504283 3/1978 United Kingdom .
2065916 7/1981 United Kingdom ............... 250/353

OTHER PUBLICATIONS

Hiroshi Takeuchi, Noriaki Hara, Teruo Kobayashi, Takashi Takeda and Kazumasa Yamamoto, "Pyroelectric Polymer Infrared Detector" *National Technical Report* vol. 26, No. 3, (Jun. 1980) pp. 413–423.

Primary Examiner—Janice A. Howell
Assistant Examiner—Constantine Hannaher
Attorney, Agent, or Firm—Marc D. Schechter

[57] ABSTRACT

An infrared radiation detector comprises a pyroelectric detector element in a hermetically sealed housing. The housing comprises a base and cover with an aperture. A Fresnel lens, for example made of polyethylene transmissive in the 8–14 μm wavelength range, is fastened over the aperture on the inside of the cover for condensing the radiation to be detected onto the detector element. In one example the Fresnel lens is held against a flange surrounding the aperture by a press-fit ring. Alternatively, the Fresnel lens is glued to a silicon window which in turn is fastened to the flange surrounding the aperture. The Fresnel lens thus forms an integral part of the detector housing avoiding the need for external mirrors or lenses.

14 Claims, 2 Drawing Figures

INFRARED RADIATION DETECTOR WITH INTEGRAL FRESNEL LENS WINDOW

BACKGROUND OF THE INVENTION

This invention relates to an infrared radiation detector comprising a pyroelectric detector element in a hermetically sealed housing.

Infrared radiation detectors comprising pyroelectric detector elements are often referred to briefly as pyroelectric detectors. Pyroelectric detectors are used for a variety of purposes, for example in remote switching systems, in intruder alarms, and in movement sensors generally. Such sensors rely on the fact that a human being naturally provides a moving source of infrared radiation as he walks about or even as he moves only part of his body, for example by waving his hand. The radiation which he emits is converted by the pyroelectric detector into an electric signal which can be used, for example, to actuate an alarm or to switch lights on or off.

The pyroelectric detector element is generally mounted in a hermetically sealed housing to shield it from environmental influences. The housing comprises a canister with an aperture and a window fixed over the aperture. The window is made of a material, such as silicon, which is transparent to infrared radiation. The radiation to be detected may be focussed onto the detector element by, for example, a concave mirror or a convex lens external to the housing. The external mirror or lens is relatively large and, as a distinct entity, has to be aligned and maintained in alignment with respect to the pyroelectric detector.

SUMMARY OF THE INVENTION

According to the present invention a pyroelectric infrared radiation detector comprises a Fresnel lens for condensing (e.g. focussing) the radiation to be detected onto the detector element. The Fresnel lens is fastened over the aperture inside the canister.

A pyroelectric detector according to the invention has the advantage of being relatively compact and inexpensive compared with prior art detection systems because the infrared radiation to be detected is focussed onto the detector element by a Fresnel lens which is fixed with respect to the detector element and which forms an integral part of the detector housing, thereby dispensing with the need for an external lens. Also, because the Fresnel lens is fastened over the aperture inside the canister the detector has the advantage of a well-defined field of view.

The Fresnel lens is preferably made of a plastic material such as polyethylene which transmits infrared radiation in the wavelength range emitted by human beings, viz. from 8 to 14 $\mu$m.

The Fresnel lens may be fastened directly or indirectly to the canister. In either case the canister preferably comprises an inwardly directed flange around the aperture. For direct fastening, the Fresnel lens may be held fast against the flange by a press-fit annular member inside the canister. For indirect fastening the Fresnel lens may be fastened, for example wth adhesive, to a separate window which in turn is fastened to the flange.

The Fresnel lens may comprise a central condensing portion integral with a peripheral noncondensing frame portion. Thus, the condensing portion can be located over the aperture, while the noncondensing frame portion can be fastened, either directly or indirectly, to the flange without wasting useful lens area. To facilitate locating the condensing portion accurately over the aperture, the shape and the overall diameter of the Fresnel lens may be substantially the same as the bore of the canister.

For the detector to be sufficiently compact, it is preferable that the diameter and focal length of the condensing portion of the Fresnel lens are both at most 10 mm. A Fresnel lens in which the condensing portion has a diameter and focal length of approximately 5 mm is particularly favorable and is compatible with a conventional pyroelectric detector housing having a T0-5 outline.

DESCRIPTION OF THE PREFERRED EMBODIMENTS

Figure 1:
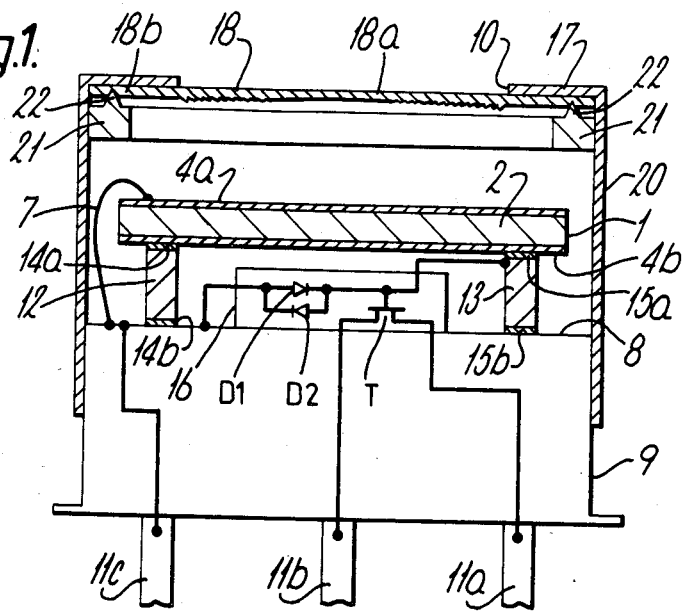
FIG. 1 is a partly schematic, partly cross-sectional view of an infrared radiation detector according to the invention.

The pyroelectric detector shown in FIG. 1 comprises a pyroelectric detector element 1 formed from a body 2 of pyroelectric ceramic material such as lanthanum and manganese doped lead zirconate titanate. (For more information about this material, see United Kingdon Pat. No. 1,504,283.) The pyroelectric body 2—which may be 2 mm long, 1 mm wide, and 150 microns thick—is sandwiched between two nichrome electrodes 4a and 4b. The electrodes 4a and 4b are substantially transparent to infrared radiation of a wavelength at which the detector is responsive.

The upper electrode 4a is electrically connected by a wire bond 7 to the surface 8 of the base 9 of a hermetically sealed housing. The housing may, for example, have a conventional T0-5 outline.

The housing also comprises a cover member in the form of an open-ended cylindrical canister 20 secured to the rim of the base 9 in known manner. The housing may be evacuated or it may be filled with a gas such as dry nitrogen which is relatively inert with respect to the component parts of the detector within the housing.

The canister 20 has a circular aperture 10 approximately 5 mm in diameter and centrally disposed in the end face. The end face comprises an inwardly directed flange 17 around the aperture. A polyethylene Fresnel lens 18 is fastened over the aperture 10 on the inside of the canister 20 as described in more detail below. It is noted here that polyethylene is most transmissive to infrared radiation in the 8 to 14 $\mu$m wavelength range.

The Fresnel lens 18 comprises a central condensing portion 18a integral with a peripheral noncondensing frame portion 18b. The condensing portion 18a may have a diameter of approximately 5 mm and a focal length of approximately 5 mm. The front plane of detector element 1 is located approximately 5 mm behind the Fresnel lens.

The condensing portion 18a of the lens 18 is registered with the aperture 10. Registration is facilitated because the overall diameter of the lens 18 (transverse to its optical axis) is approximately the same as the bore of the canister 20. The canister 20 thus provides a locating guide for the lens 18 when it is inserted during assembly so that when the lens 18 is flat against the flange 17 the condensing portion 18a is registered with the aperture 10.

As is well-known, a Fresnel lens comprises an array of concentric prisms each having a convex surface of the same curvature as the corresponding portion of a normally shaped convex lens. However, compared with a normally shaped convex lens, the bulk of the material between the refracting surfaces is reduced.

The Fresnel lens 18 is of the plano-convex type with its plane face directed outward from the detector. Adjacent prisms are separated by recesses or so-called "grooves". In the present embodiment, the lens 18 has approximately 25 grooves across the full 5 mm diameter of the condensing portion 18a. Near the center of the lens, the inclined surfaces of these grooves are nearly parallel to the plane face. Moving toward the peripheral frame portion 18b, these inclined surfaces become steeper. The thickness of the Fresnel lens is preferably less than 1 mm, for example approximately 0.25 mm.

The Fresnel lens 18 is held fast against the flange 17 by a press-fit ring 21 inside the canister 20, thus providing an hermetic seal. A sharp annular projection 22 on the side of the ring 21 facing the flange 17 bites into the frame portion 18b of the lens to ensure secure fastening. For clarity in FIG. 1, the projection 22 is shown on an enlarged scale and the main body of the ring 21 is shown spaced apart from the lens 18. In practice, however, the projection would be sunk into the frame portion 18b to such a depth that the main body of the ring 21 would be flush against the frame portion 18b. Being a press-fit, the ring 21 is held fast by frictional engagement with the internal wall of the canister 20.

Three conductive leads, 11a, 11b and 11c extend from the base 9 of the housing for making external electrical connections to the detector. Two of the leads 11a and 11b extend through the base 9 to form terminals (not shown) which protrude above surface 8. The third lead 11c is conductively connected to surface 8 and hence also to the upper electrode 4a of the detector element.

The detector element 1 is maintained spaced above the base 9 by two equally tall supporting pillars 12 and 13. The pillar 12, which is electrically insulating, may be made of a ceramic such as high density alumina and may be fastened between the detector element 1 and the surface 8 of base 9 using insulating adhesives 14a and 14b at its upper and lower ends, respectively.

The pillar 13, which is electrically conductive, may be made of an electrically conductive material or, alternatively of an insulating material such as alumina but with a conductive coating of, for example, gold. The upper end of pillar 13 is fastened and electrically connected to the lower electrode 4b of detector element 1 with a conductive adhesive 15a. The lower end is fastened to the surface 8 of base 9 with an insulating adhesive 15b. The conductive adhesive used here may be Ablebond 36/2 (Trade Mark) available from Ablestick laboratories, U.S.A. The nonconductive adhesive may be a conventional epoxy adhesive.

As shown schematically in FIG. 1 the lower electrode 4b of detector element 1 is connected electrically via the pillar 13 to the gate of a field effect transistor T. Two diodes D1 and D2 in parallel opposition are connected between the gate of the transistor T and the lead 11c (via surface 8) to provide a gate leakage path for the transistor T.

The source and drain of the transistor T are connected to the leads 11a and 11b via the terminals (not shown) which protrude above the surface 8 as mentioned earlier. The circuit comprising the transistor T and diodes D1 and D2 may, for example, be formed in a single semiconductor chip contained in an encapsulating package 16 such as a plastic encapsulated microminiature package.

Figure 2:
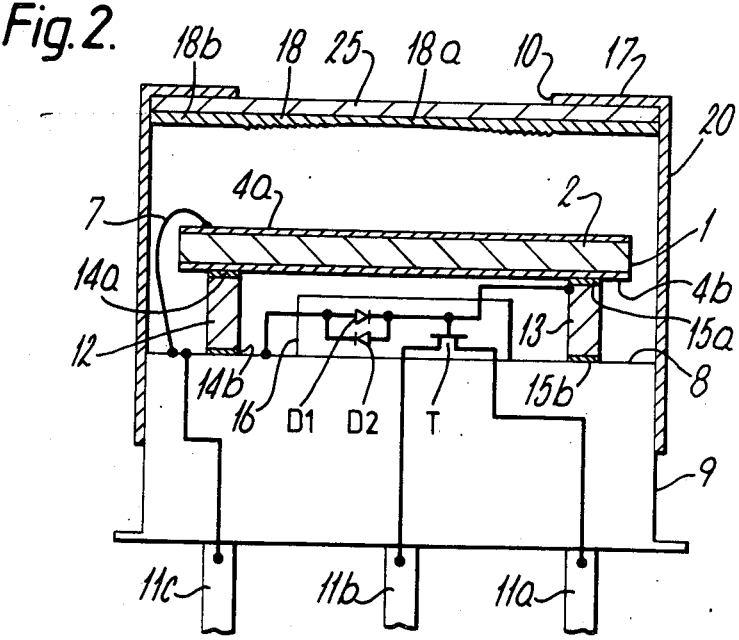
FIG. 2 is a partly schematic, partly cross-sectional view of a different infrared radiation detector according to the invention.

The pyroelectric detector shown in FIG. 2 has the Fresnel lens fastened in a different manner, that is to say without using a press-fit ring as described above. In all other respects this detector is equivalent to the detector of FIG. 1, and hence the same reference numerals are used to designate the same elements.

In FIG. 2, the Fresnel lens 18 is fastened with adhesive to a silicon window 25 on the side of the window remote from the flange 17. The window 25 in turn is fastened over the aperture 10 in the canister 20. The silicon window, which acts as a filter transmitting radiation in the wavelength range from approximately 1 to 15 μm, has the same diameter as the Fresnel lens and the adhesive is provided over the whole interface between the window 25 and the lens 18.

The silicon window 25 is fastened, also with adhesive, around its full periphery to the flange 17 thereby providing a hermetic seal. In this manner the Fresnel lens 18 is fastened indirectly to the canister 20 over the aperture 10.

Of course the particular embodiments described above are merely illustrative. It will be appreciated that various modifications can be made within the scope of the invention. For example, in the FIG. 1 embodiment the continuous annular projection 22 on the press-fit ring 21 may be replaced by discrete tooth-like projections which perform the same function and thus bite into the Fresnel lens to ensure secure fastening.

As a further example, in the FIG. 2 embodiment the Fresnel lens and the window can be fastened additionally or alternatively with a press-fit ring as described with reference to FIG. 1. Moreover, instead of comprising only a single pyroelectric detector element, a detector according to the invention may comprise two or more pyroelectric detector elements connected differentially for providing greater immunity to false alarms due to ambient temperature changes.

We claim:

1. An infrared radiation detector comprising:
a hermetically sealed housing; and
a pyroelectric detector element arranged in the hermetically sealed housing;
characterized in that the hermetically sealed housing comprises:
a canister having an aperture therein; and
a Fresnel lens arranged in the hermetically sealed housing over the aperture to condense radiation onto the detector element.

2. An infrared radiation detector as claimed in claim 1, characterized in that the Fresnel lens comprises a central condensing portion and a peripheral noncondensing frame portion.

3. An infrared radiation detector as claimed in claim 2, characterized in that the condensing portion has a diameter not greater than 10 mm.

4. An infrared radiation detector as claimed in claim 3, characterized in that the condensing portion has a diameter approximately equal to 5 mm.

5. An infrared radiation detector as claimed in claim 1, characterized in that the Fresnel lens has a focal length not greater than 10 mm.

6. An infrared radiation detector as claimed in claim 5, characterized in that the Fresnel lens has a focal length approximately equal to 5 mm.

7. An infrared radiation detector as claimed in claim 1, characterized in that:
   the canister has a bore;
   the detector has an optical axis; and
   the bore and the lens have approximately equal cross-sectional shapes and sizes transverse to the optical axis.

8. An infrared radiation detector as claimed in claim 1, characterized in that:
   the canister has an inwardly extending flange arranged around the aperture; and
   the lens is held against the flange by an annular press-fit member inside the canister.

9. An infrared radiation detector as claimed in claim 8, characterized in that the annular member has a projection which bites into the lens.

10. An infrared radiation detector as claimed in claim 1, characterized in that the housing further comprises a window arranged in the canister over the aperture, the lens being fastened to the window.

11. An infrared radiation detector as claimed in claim 1, characterized in that:
    the canister has an inwardly extending flange arranged around the aperture; and
    the window is fastened to the flange and the Fresnel lens is fastened to the window.

12. An infrared radiation detector as claimed in claim 11, characterized in that the Fresnel lens is fastened to the window with adhesive.

13. An infrared radiation detector as claimed in claim 12, characterized in that the Fresnel lens is made of a plastic material which is transparent to infrared radiation in the 8 to 14 micron wavelength range.

14. An infrared radiation detector as claimed in claim 13, characterized in that the Fresnel lens is made of polyethylene.

* * * * *